United States Patent [19]
Hu

[11] Patent Number: 5,724,199
[45] Date of Patent: Mar. 3, 1998

[54] ADJUSTABLE AUXILIARY REAR-VIEW MIRROR MOUNTING STRUCTURE

[76] Inventor: Tsai-Fu Hu, 200, Fu Chiang Road, Sec. 2, Yung Kang, Tainan, Taiwan

[21] Appl. No.: 660,291

[22] Filed: Jun. 7, 1996

[51] Int. Cl.[6] .................................................. G02B 7/182
[52] U.S. Cl. ........................ 359/872; 359/871; 359/873; 359/874
[58] Field of Search ................................. 359/871, 872, 359/873, 874

[56] References Cited

U.S. PATENT DOCUMENTS

| | | | |
|---|---|---|---|
| 4,927,255 | 5/1990 | Martinez | 359/872 |
| 5,022,748 | 6/1991 | Santo | 359/872 |
| 5,383,061 | 1/1995 | Lanier | 359/872 |
| 5,566,030 | 10/1996 | Yue | 359/872 |

*Primary Examiner*—Paul M. Dzierzynski
*Assistant Examiner*—Mohammad Y. Sikder
*Attorney, Agent, or Firm*—Pro-Techtor International

[57] ABSTRACT

An adjustable auxiliary rear-view mirror mounting structure including two inner arms fastened to two opposite sides of the rear-view mirror of a motor vehicle, two outer arms pivoted to the inner arms to hold a lamp socket and mirror assembly, and binding means connected between the inner arms, wherein the inner arms have a respective toothed wall portion horizontally disposed at one end and a screw hole at the center of the toothed wall portion thereof; the outer arms have a respective toothed wall portion vertically disposed at one end and a screw hole at the center of the toothed wall portion thereof; each of the connectors has a toothed horizontal coupling section at one end detachably meshed with the toothed wall portion of one inner arm, a first through hole at the center of the toothed horizontal coupling section and fixed to the screw hole of the second end of one inner arm at the desired angle by a first screw and a first nut, a toothed vertical coupling section at an opposite end detachably meshed with the toothed wall portion of one outer arm, a second through hole at the center of said toothed vertical coupling section and fixed to the screw hole of the first end of one outer arm at the desired angle by a second screw and a second nut, each of the first screw and the second screw being coupled with a respective cap adapted for turning by hand.

12 Claims, 14 Drawing Sheets

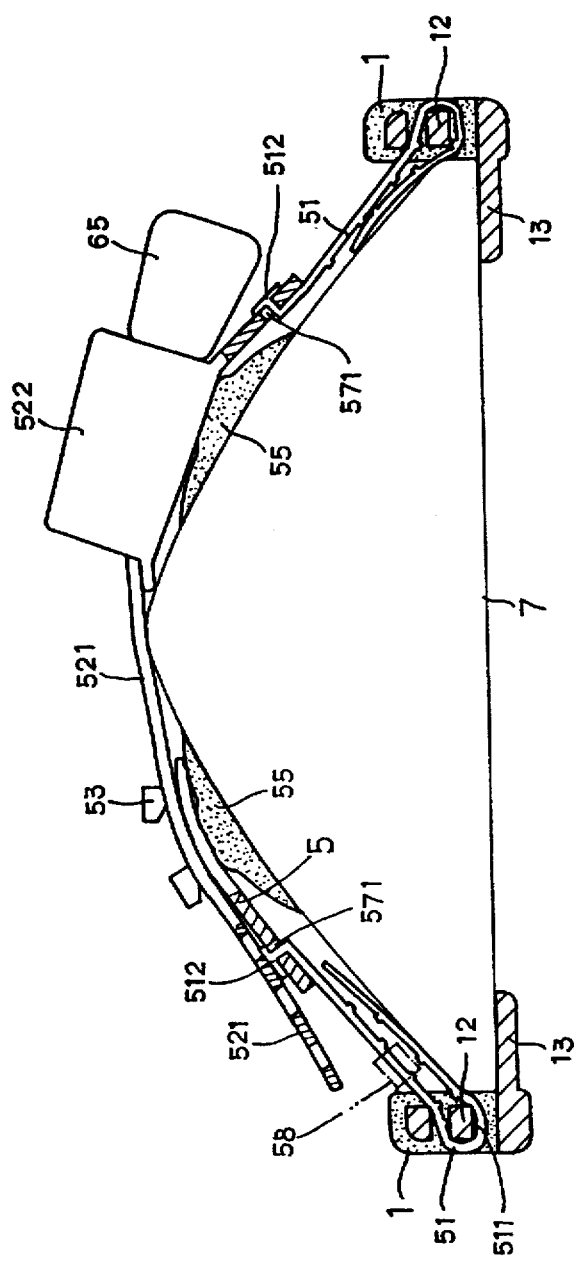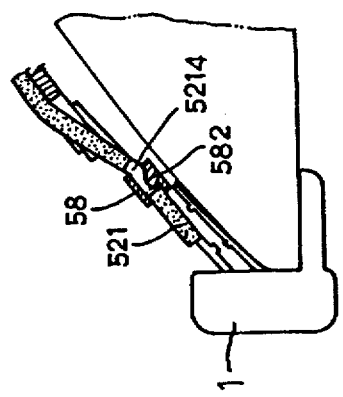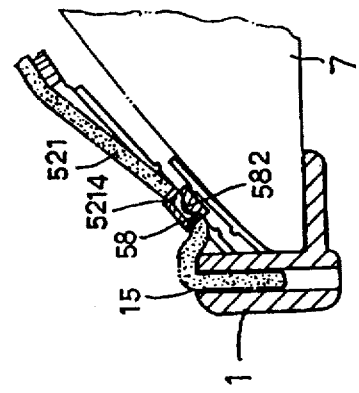

ADJUSTABLE AUXILIARY REAR-VIEW MIRROR MOUNTING STRUCTURE

BACKGROUND OF THE INVENTION

The present invention relates to an auxiliary rear-view mirror for motor vehicles, and relates more particularly to the mounting structure of an auxiliary rear-view mirror which can be horizontally and vertically adjusted to the desired angle.

FIG. 1 shows an auxiliary rear-view mirror (30) fastened to the rear-view mirror (20) of a motor vehicle (10) by a mounting device (40). This mounting device (40) comprises a pair of inner arms (401), a pair of outer arms (402) respectively pivoted to the inner arms (401) by a pivot bolt (403), and two rubber straps (50) connected between the inner arms (401). The inner arms (401) have slots (4011) and lugs (4012) for the positioning of the rubber straps (50). This structure of mounting device has numerous drawbacks as outlined hereinafter.

1) The mounting device tends to be damaged upon an impact force because the outer arms cannot be turned horizontally relative to the inner arms;
2) The mounting device requires much storage space when assembled;
3) The auxiliary rear-view mirror tends to vibrate after installation because the elastic material property of the rubber straps deteriorates with use quickly.

SUMMARY OF THE INVENTION

The present invention has been accomplished to provide an adjustable auxiliary rear-view mirror mounting structure which eliminates the aforesaid drawbacks. According to one aspect of the present invention the adjustable auxiliary rear-view mirror mounting structure comprises two inner arms fastened to two opposite sides of the rear-view mirror of a motor vehicle, two outer arms pivoted to the inner arms to hold a lamp socket and mirror assembly, and binding means connected between the inner arms, wherein the inner arms have a respective toothed wall portion horizontally disposed at one end and a screw hole at the center of the toothed wall portion thereof; the outer arms have a respective toothed wall portion vertically disposed at one end and a screw hole at the center of the toothed wall portion thereof; each of the connectors has a toothed horizontal coupling section at one end detachably meshed with the toothed wall portion of one inner arm, a first through hole at the center of the toothed horizontal coupling section and fixed to the screw hole of the second end of one inner arm at the desired angle by a first screw and a first nut, a toothed vertical coupling section at an opposite end detachably meshed with the toothed wall portion of one outer arm, a second through hole at the center of said toothed vertical coupling section and fixed to the screw hole of the first end of one outer arm at the desired angle by a second screw and a second nut, each of the first screw and the second screw being coupled with a respective cap adapted for turning by hand. Because the outer arms can be turned relative to the inner arms horizontally as well as vertically, the frame structure of the assembly will be not damaged easily upon an impact force. According to another aspect of the present invention, the binding means comprises: a first binding device and a second binding device respectively made from engineering plastics and fastened to the first ends of said inner arms, and a connecting device connected between the first binding device and the second binding device, the first binding device comprising a receptacle, the second binding device comprising a series of studs, the connecting device comprising a tie strap, a screw, a nut, and a cup, the tie strap having a longitudinal series of retaining holes longitudinally spaced from a tail end thereof and adapted for coupling to the series of studs of said second binding device, and a head at one end inserted into the receptacle of the first binding device and secured thereto by the screw, nut, and cup of the connecting device, the head of the tie strap having a longitudinal through hole for the passing of the screw of the connecting device, a transverse slot intersecting the longitudinal through hole thereof and adapted for receiving the nut of the connecting device, the screw of the connecting device is inserted through a through hole in the cup of the connecting device and the longitudinal through hole of the head of the tie strap and threaded into the nut of said connecting device.

BRIEF DESCRIPTION OF THE DRAWINGS

FIG. 12 is similar to FIG. 8 but showing the application of the alternate form of the binding device shown in FIG. 11;

FIG. 12A is a sectional view era part of the embodiment of the present invention shown in FIG. 4, showing the tail of the tie strap inserted into the transverse slot of one inner arm;

FIG. 12B is a sectional view of a part of the embodiment of the present invention shown in FIG. 10, showing the pin of the intermediate loop of the strap holder fastened to one retaining slot of the tie strap;

DETAILED DESCRIPTION OF THE PREFERRED EMBODIMENT

Figure 1:
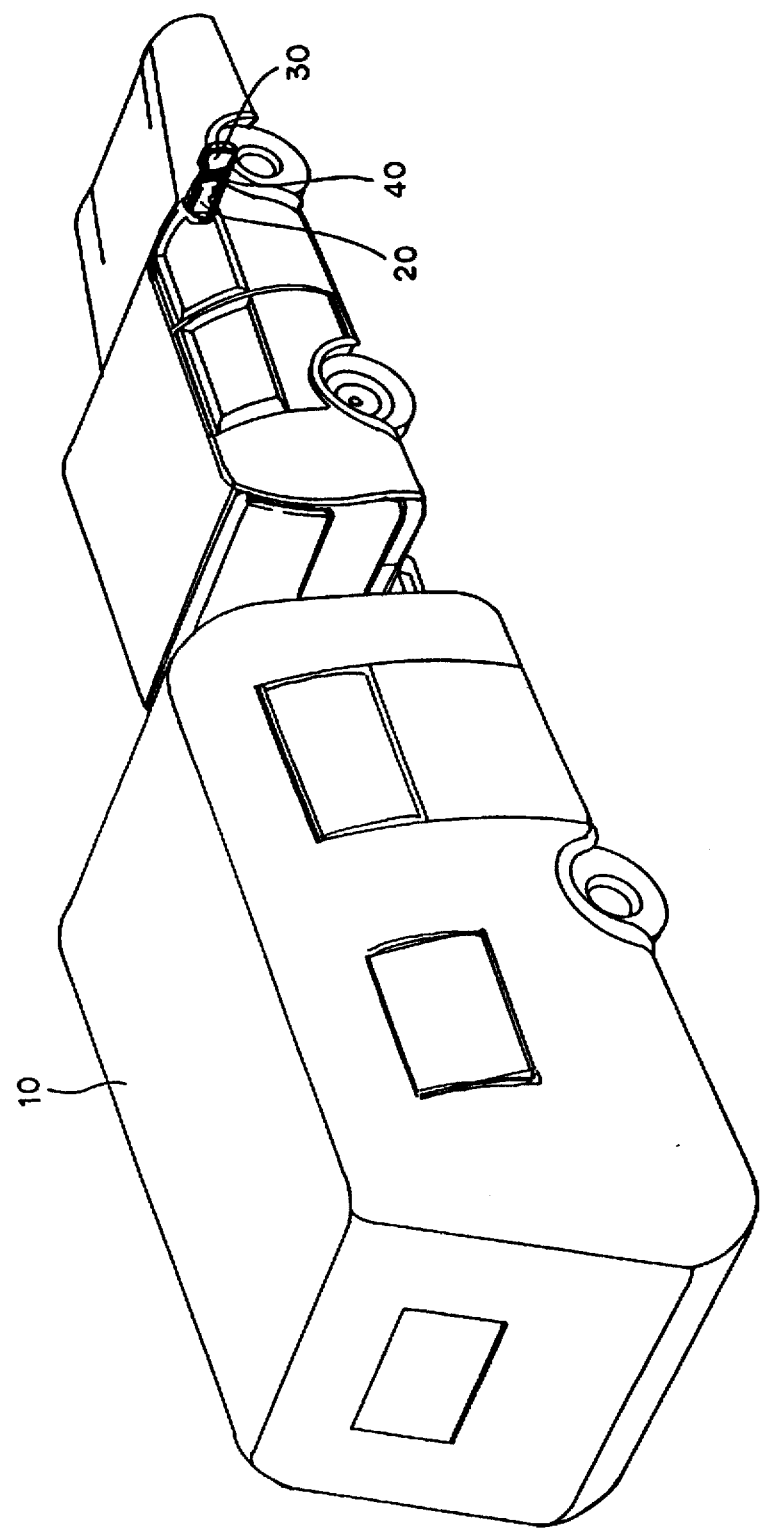
FIG. 1 shows an auxiliary rear-view mirror installed in a vehicle rear-view mirror according to the prior art.
Figure 2:
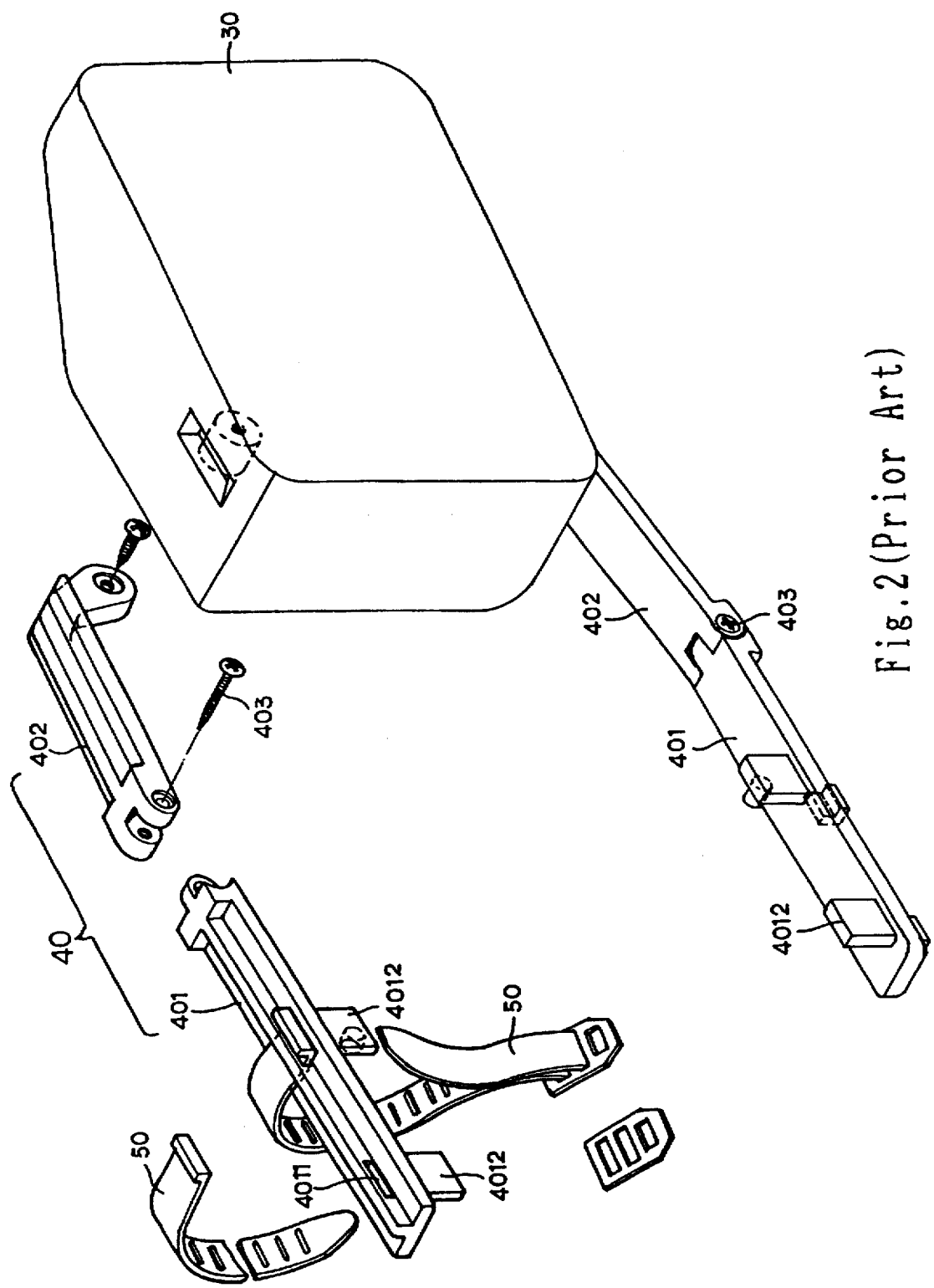
FIG. 2 is an exploded view of the auxiliary rear-view mirror mounting device shown in FIG. 1.
Figure 3:
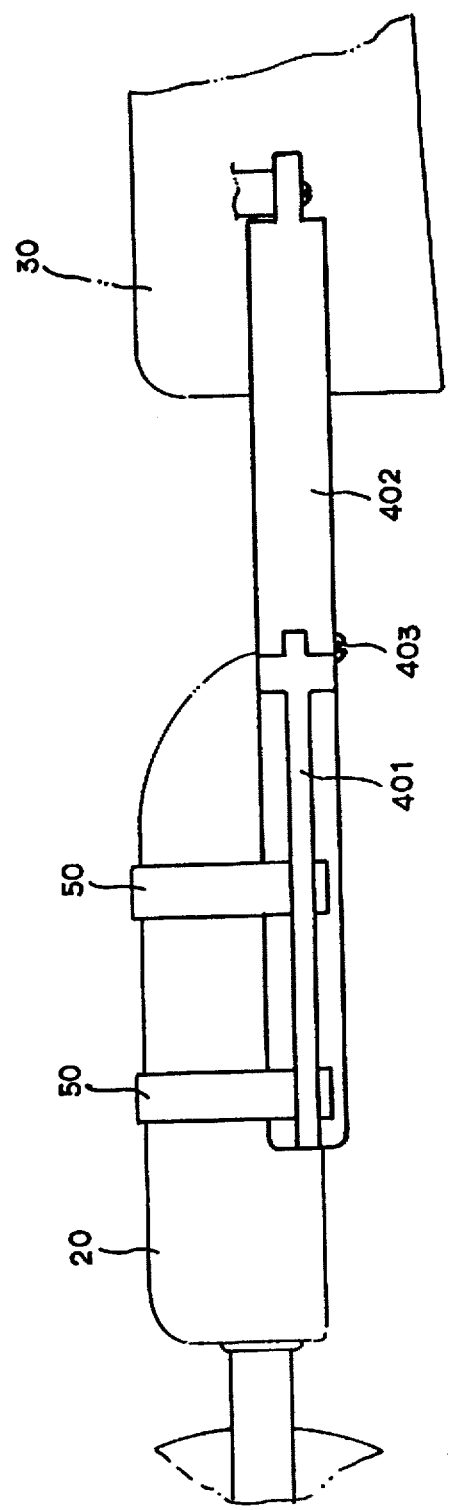
FIG. 3 is top view of the auxiliary rear-view mirror mounting device shown in FIG. 1.
Figure 4:
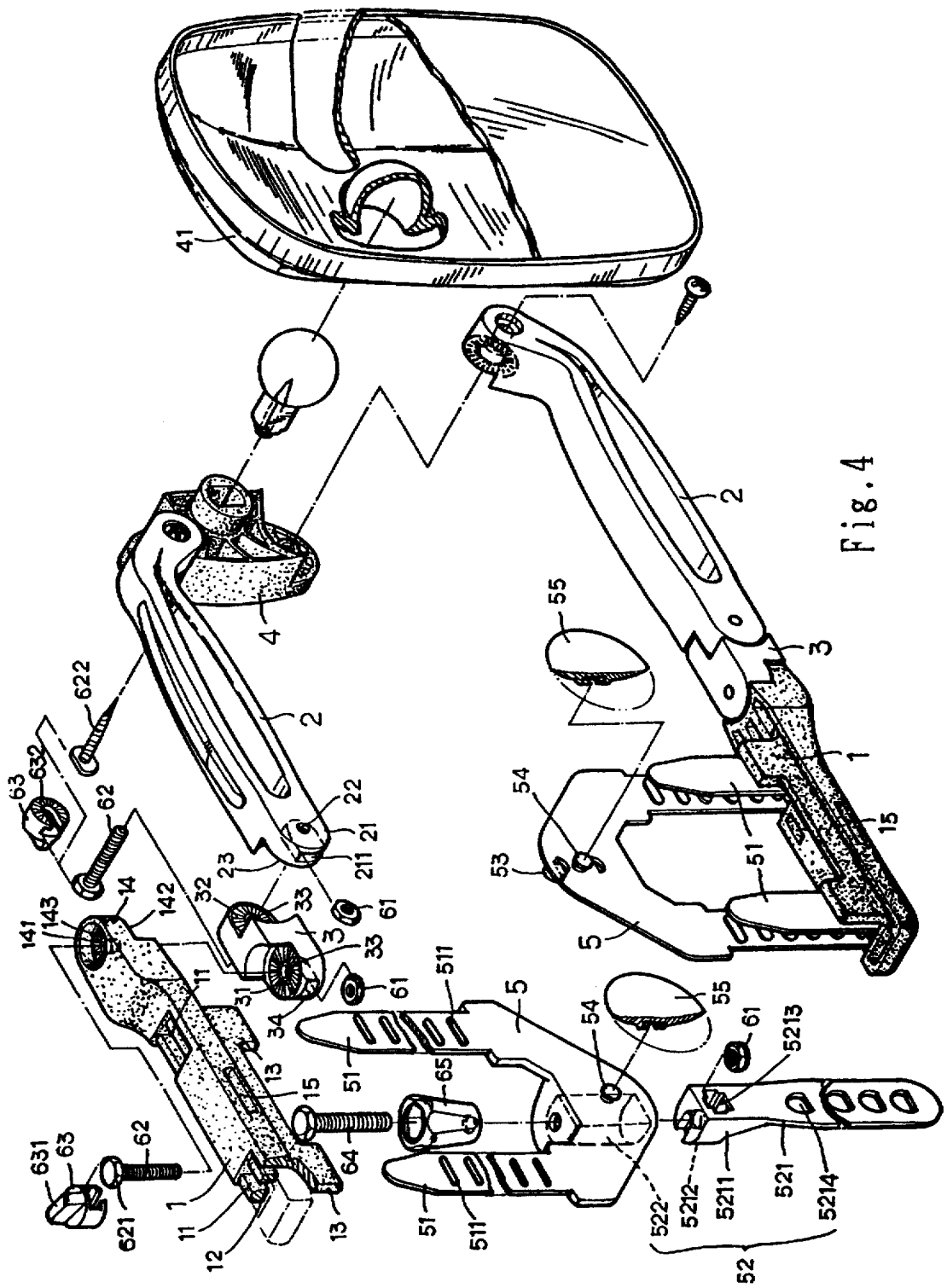
FIG. 4 is an exploded view of an adjustable auxiliary rearview mirror mounting structure according to one embodiment of the present invention.
Figure 5:
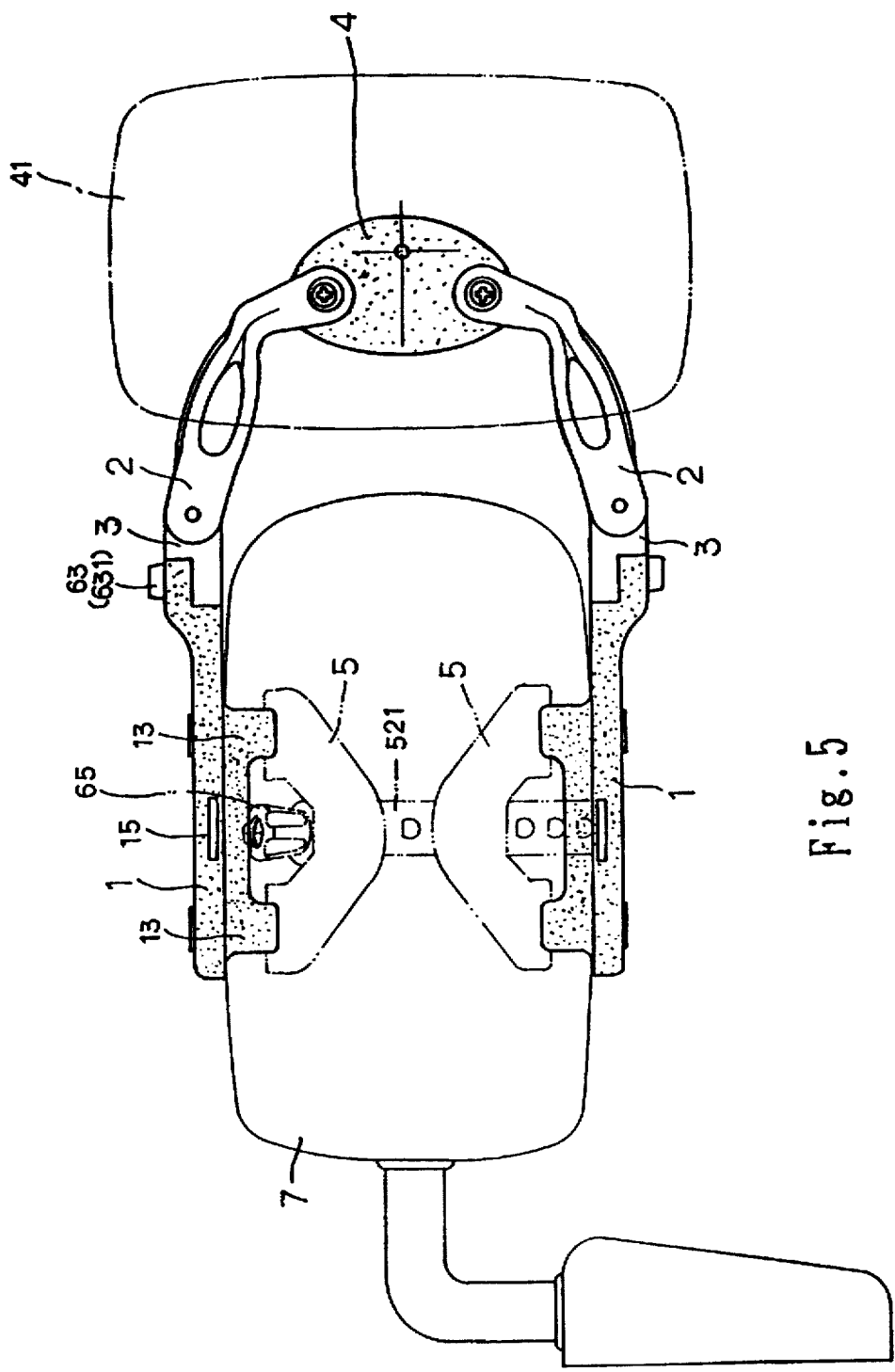
FIG. 5 is a from view showing the embodiment of FIG. 4 installed in a vehicle rear-view mirror.
Figure 6:
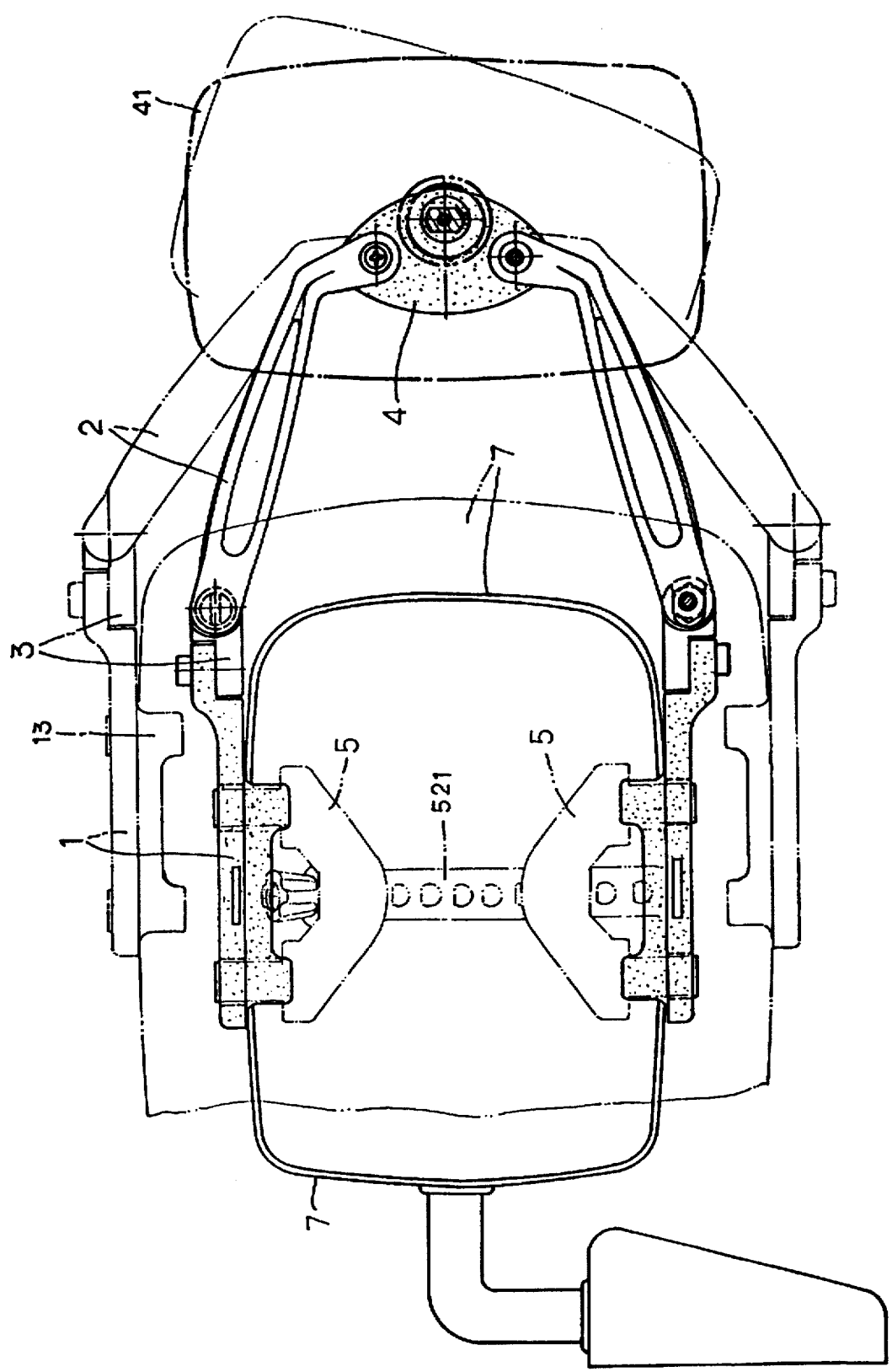
FIG. 6 is similar to FIG. 5 but showing the outer arms adjusted relative to the inner arms and the lamp socket and mirror holder adjusted relative to the outer arms.
Figure 7:
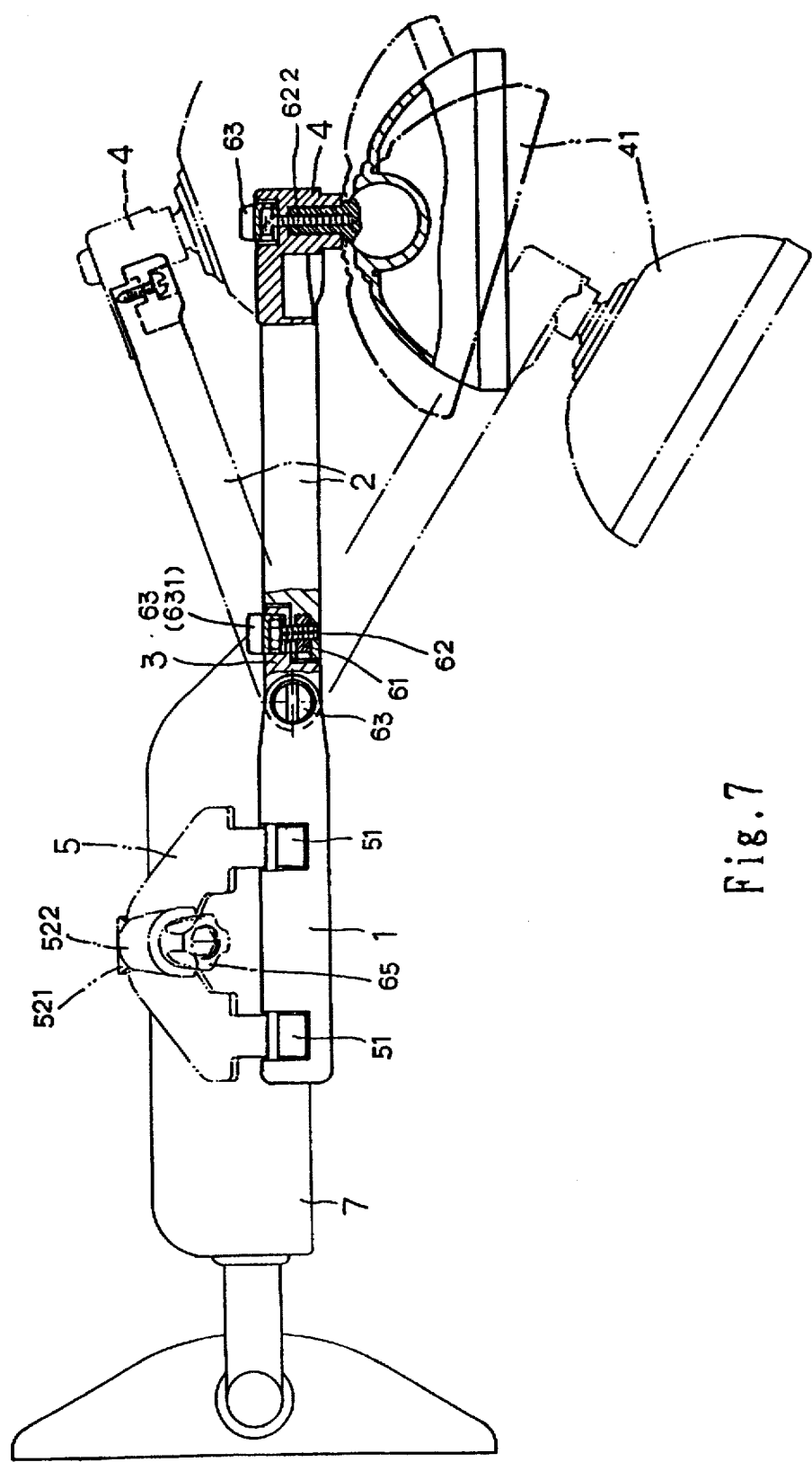
FIG. 7 is a top view of FIG. 6.

Referring to FIGS. 4 and 5, an adjustable auxiliary rearview mirror mounting structure in accordance with a first embodiment of the present invention is generally comprised of a pair of inner arms 1, a pair of outer arms 2, a pair of connectors 3, a lamp socket and mirror holder 4, and a pair of binding devices 5.

Each of the inner arms 1 comprises two through holes 11, a rib 12 disposed between the through holes 11 for the mounting of the binding devices 5, two lugs 13 aligned at one side and respectively disposed adjacent to the through holes 11 and adapted for fastening to the rear-view mirror of a motor vehicle, and a circular coupling section 14 at one end. The circular coupling section 14 comprises a toothed wall portion 142 horizontally disposed at one side, a toothed recess 143 formed in an opposite side, and a screw hole 141 made through the toothed wall portion 142 and the toothed recess 143.

Each of the outer arms 2 has an outer end toothed and connected to the mirror and lamp assembly 4, and an inner end terminating in a circular coupling section 21. The circular coupling section 21 comprises a toothed wall portion 23 at one side, and a slot 211 at an outer side adapted for receiving a nut 61, and a screw hole 22 at the center through the toothed wall portion 23 and intersecting the slot 211.

Each of the connectors 3 comprises a toothed horizontal coupling section 31 and a toothed vertical coupling section 32 at two opposite ends, two through holes 33 respectively disposed at the center of the coupling portions 31,32, and a slot 34 at an outer side adapted for receiving a nut 61. Screws 62 are respectively mounted in the screw holes 141,22 and the through holes 33 and screwed up with the nuts 61 in the slots 211,34 to secure the arms 1,2 and the connectors 3 together. Each of the screws 62 has a head 621 coupled with a cap 63 for turning. The cap 63 has a handle 631 for turning by hand, and a toothed bottom wall portion 632 adapted for engaging the toothed recess 143 (the toothed vertical coupling section 32 of each of the connectors 3 has a toothed recess similar to the toothed recess 143 of the coupling section 14 of each of the inner arms 1).

The lamp socket and mirror holder 4 is connected between the outer arms 2 to hold an auxiliary mirror 41. The auxiliary mirror 41 is fastened to the lamp socket and mirror holder 4 by a self-tapping screw 622, which is also coupled with a cap 63 for turning by hand.

Figure 8:
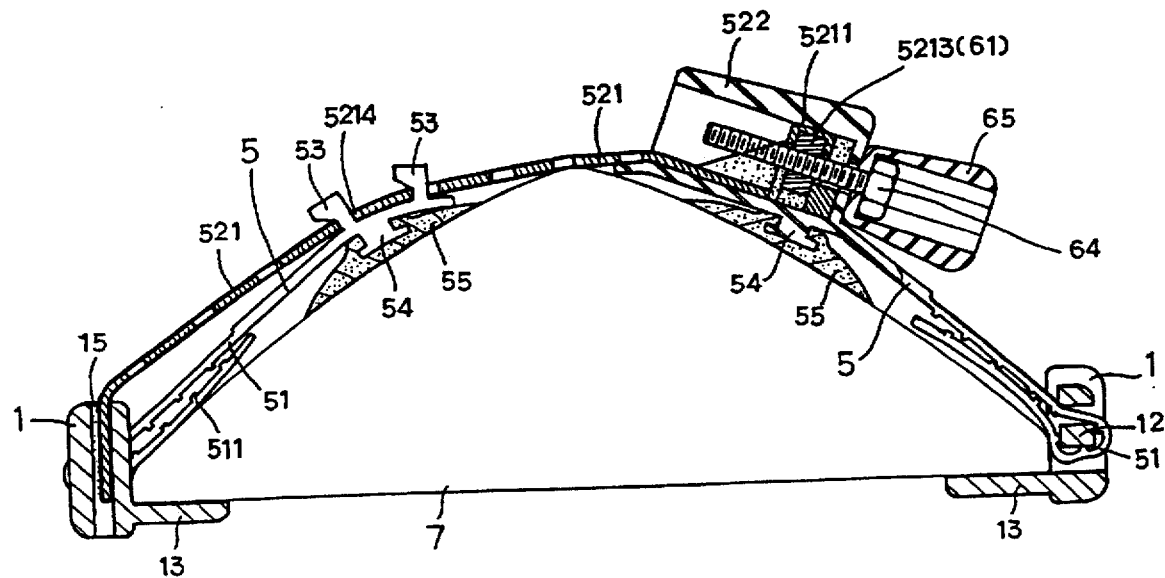
FIG. 8 is a cross sectional view of FIG. 5.
Figure 8A:
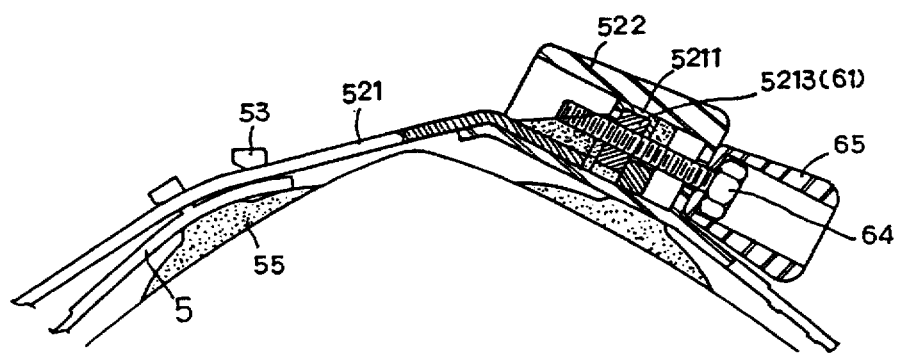
FIG. 8A is similar to FIG. 8 but showing the connecting device loosened.

The binding devices 5 are made from engineering plastics, having a substantially Y-shaped profile. Each of the binding devices 5 comprises two binding straps 51 bilaterally and outwardly extending from one end thereof and respectively inserted into the through holes 11 of one inner arm 1, each binding strap 51 having a series of longitudinally spaced teeth 511 forced into engagement with the rib 12 of the respective inner arm 1. A connecting device 52 is provided to connect the finding devices 5 together. The connecting device 52 comprises a tie strap 521, a receptacle 522 integrally formed in one binding device 5, and a plurality of stubs 53 formed in the other binding device 5. The tie strap 521 comprises a head 5211 fastened to the receptacle 522, a longitudinal through hole 5212 at the center of the head 5211, a transverse slot 5213 in the head 5211 intersecting the longitudinal through hole 5212 and adapted for receiving a nut 61, and a series of longitudinally spaced retaining holes 5214 adapted for coupling to the studs 53. When the head 5211 of the tie strap 521 is inserted into the receptacle 522 it is secured thereto by a screw 54. The screw 54 is coupled with a cup 65, mounted in the receptacle 522, inserted into the through hole 5212, and threaded into the nut 61 in the slot 5213 of the head 5211 of the tie strap 521. When the binding devices 5 are secured to the rear-view mirror 7, the screw 64 can be turned by the cup 65 to tighten up the tie strap 521 (see FIG. 8) or loosen it (see FIG. 8A). Each of the binding devices 5 further comprises a retainer rod 54, and a vacuum mount 55 coupled to the retainer rod 54 and adapted for securing to the rear-view mirror 7. Each of the inner arms 1 further comprises a transverse slot 15 adapted for receiving the tail of the tie strap 521 of the connecting device 52.

Figure 9:
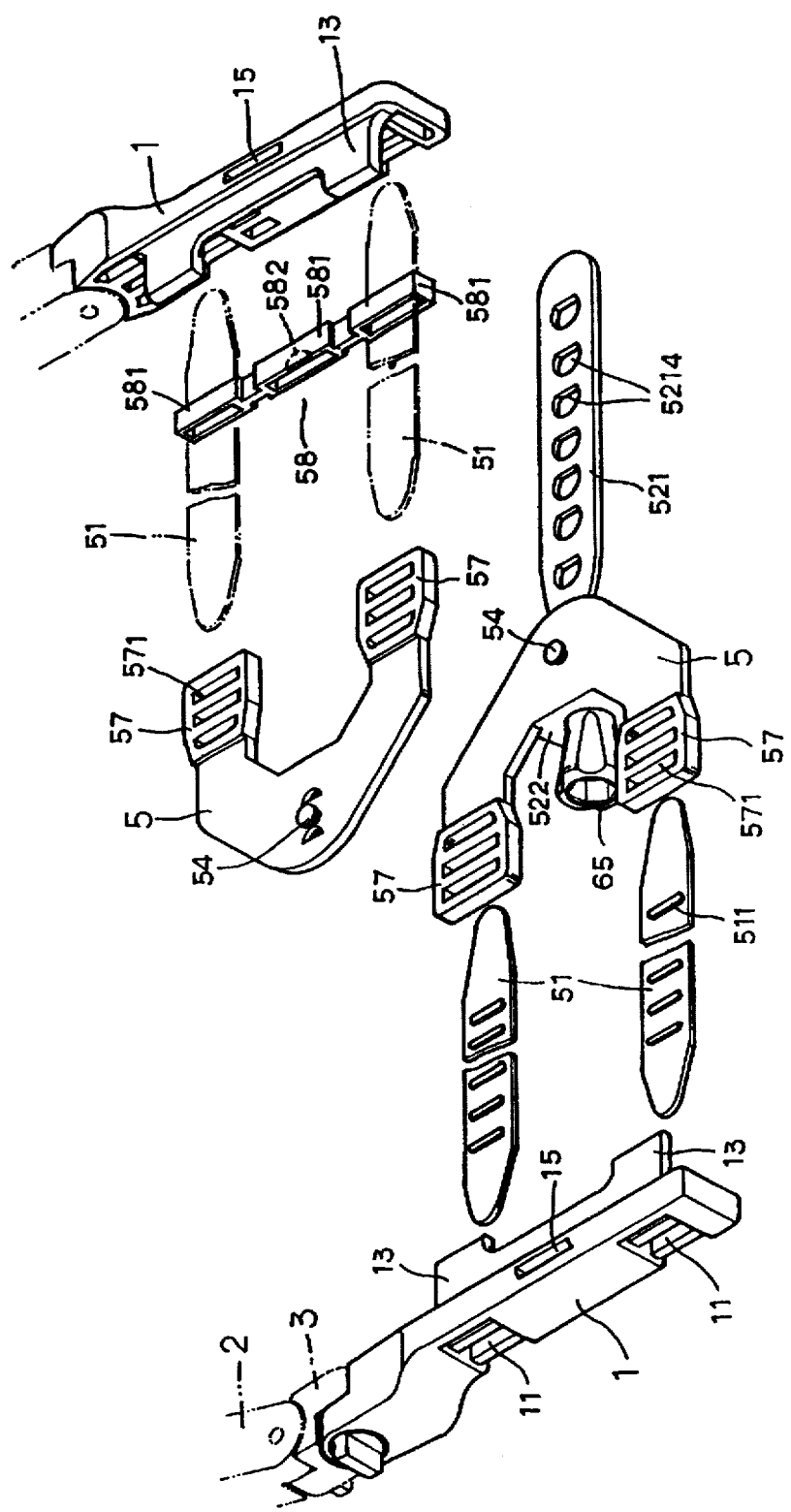
FIG. 9 is an exploded view of a part of the present invention, showing an alternate form of the binding devices.
Figure 10:
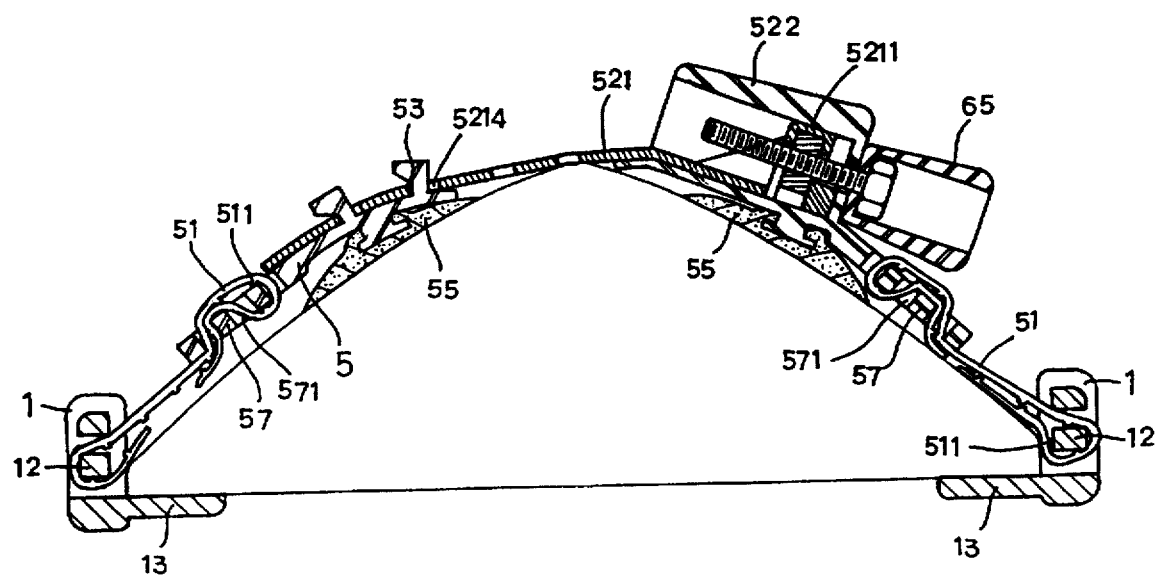
FIG. 10 is similar to FIG. 8 but showing the application of the alternate form of the binding device shown in FIG. 9.

FIGS. 9 and 10 show an alternate form of the present invention, in which the binding straps 51 and the binding devices 5 are separately made, and then detachably connected together. According to this alternate form, each of the binding devices 5 has two retaining plates 57, each retaining plate 57 defining a plurality of parallel retaining slots 571 for the insertion of one binding strap 51, permitting the teeth 511 of the corresponding binding strap 51 to be forced into engagement with the retaining slots 571.

Figure 11:
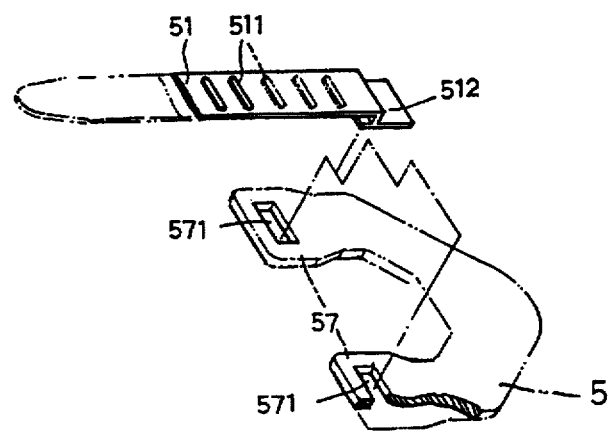
FIG. 11 is an exploded view of another alternate form of the binding device according to the present invention.

FIGS. 11 and 12 show another alternate form of the present invention in which the binding straps 51 and the binding devices 5 are separately made, and then detachably connected together. According to this alternate form, each of the binding devices 5 has two retaining plates 57, each retaining plate 57 defining one two retaining plates 57, each retaining plate 57 defining one retaining slot 571. Each of the binding straps 51 has a hooked portion 512 at one end adapted for hooking in the retaining slot 571 of one retaining plate 57.

Referring to FIGS. 12A and 12B, and FIGS. 9 and 12 again, a strap holder 58 may be mounted between the two binding straps 51 of one binding device 5 for holding the tail of the tie strap 521. The strap holder 58 comprises three loops 581 connected in series. The two loops 581 at two opposite lateral sides are adapted for receiving the binding straps 51, and the loop 581 in the middle is adapted for receiving the tail of the tie strap 521 and having a pin 582 at an inner side adapted for fastening to one retaining hole 5214 (see FIG. 12B).

Figure 13:
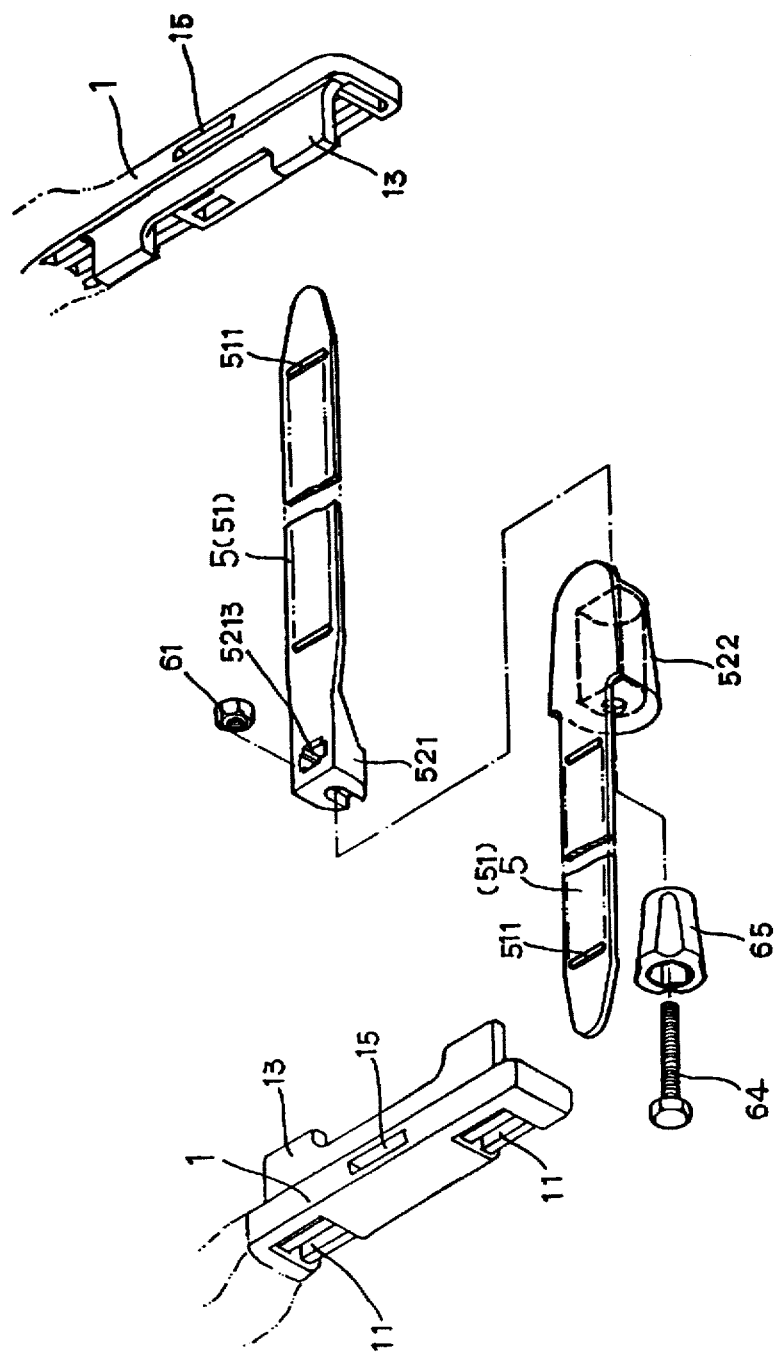
FIG. 13 is an exploded view era part of still another alternate form of the present invention.
Figure 14:
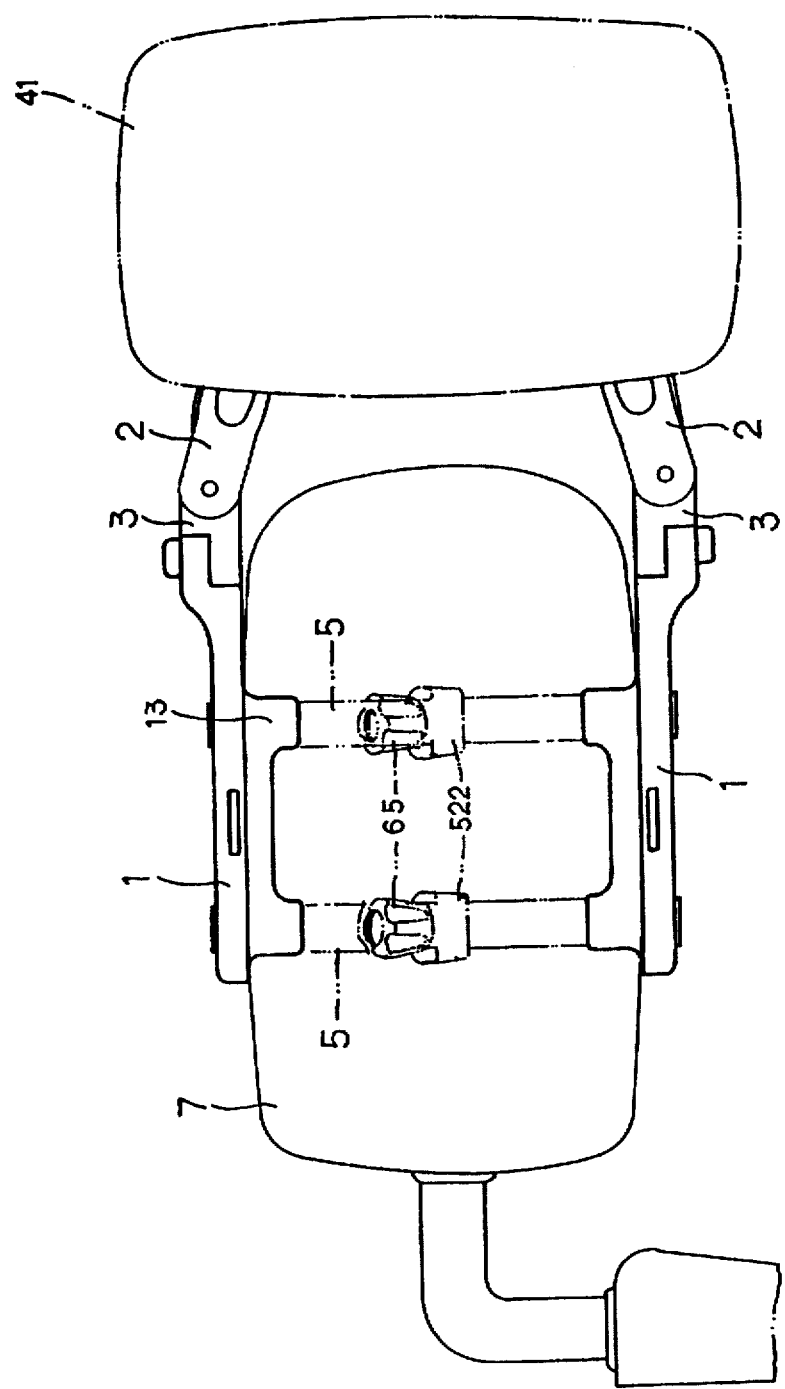
FIG. 14 is a front view of the alternate form of FIG. 13 when installed.
Figure 15:
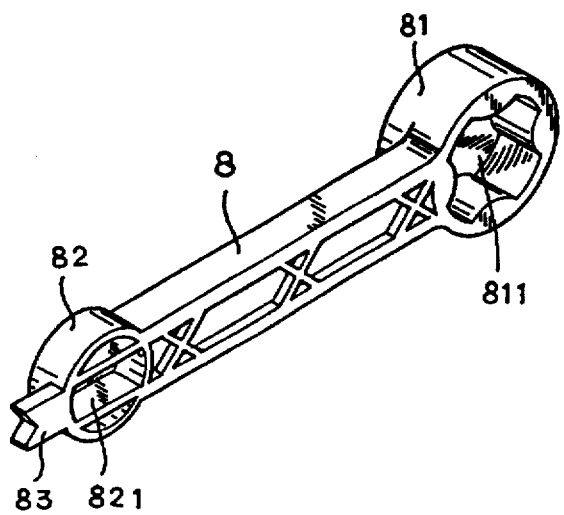
FIG. 15 is an elevational view of a wrench according to the present invention.
Figure 15A:
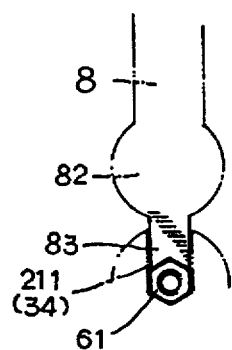
FIG. 15A is an applied view of the wrench shown in FIG. 15.
Figure 15B:
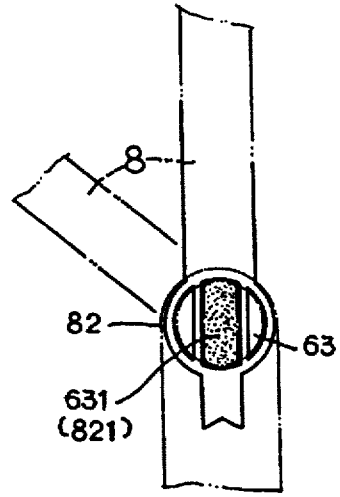
FIG. 15B is another applied view of the wrench shown in FIG. 15.
Figure 15C:
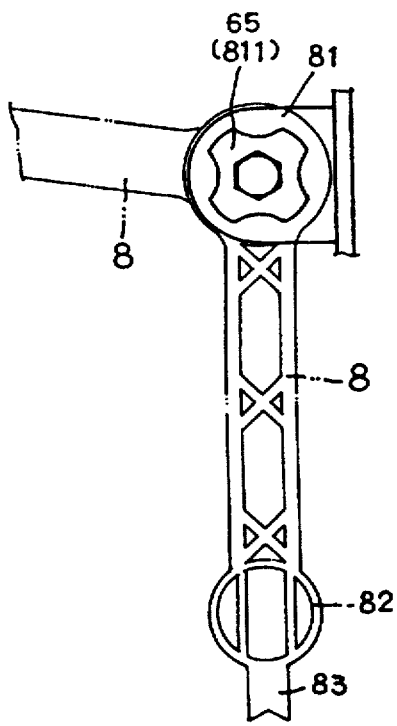
FIG. 15C is still another applied view of the wrench shown in FIG. 15.

FIGS. 13 and 14 show still another alternate form of the present invention. According to this alternate form, each of the binding devices 5 is comprised of a binding strap 511 with a tie strap 521, and a binding strap 511 with a receptacle 522. The tie strap 521 is adjustably fastened to the receptacle 522 by a screw 64, a nut 61 which is mounted in one slot 5213 of the tie strap 521 and screwed up with the screw 64, and a cup 65.

FIGS. 15, 15A, 15B, 15C show a wrench 8 adapted for turning the afroesaid cup 65 and cap 63. Through the wrench 8, the screws 62,64 can be conveniently rotated. The wrench 8 comprises a first head 81 defining a crossed slot 811, a second head 82 defining a Phillips slot 821, and a projecting tip 83 raised from the second head 82.

It is to be understood that the drawings are designed for purposes of illustration only, and are not intended as a definition of the limits and scope of the invention disclosed.

What the invention claimed is:

1. An adjustable auxiliary rear-view mirror mounting structure comprising:

a pair of inner arms, each inner arm having a first end adapted for fastening to the rear-view mirror of a motor vehicle, and a second end;

a pair of outer arms, each outer arm having a first end pivoted the second end of one inner arm, and a second end;

two connectors respectively connected between the second ends of said inner arms and the first ends of said outer arms;

a lamp socket and mirror holder fastened to the second ends of said outer arms; and binding means connected between the first ends of said inner arms;

wherein the second end of each of said inner arms has a toothed wall portion horizontally disposed at one side and a screw hole at the center of the toothed wall portion thereof; the first end of each of said outer arms has a toothed wall portion vertically disposed at one side and a screw hole at the center of the toothed wall portion thereof; each of said connectors has a toothed horizontal coupling section at one end detachably meshed with the toothed wall portion of one inner arm, a first through hole at the center of said toothed horizontal coupling section and fixed to the screw hole of the second end of one inner arm at the desired angle by a first screw and a first nut, a toothed vertical coupling section at an opposite end detachably meshed with the toothed wall portion of one outer arm, a second through hole at the center of said toothed vertical coupling section and fixed to the screw hole of the first end of one outer arm at the desired angle by a second screw and a second nut, each of said first screw and said second screw being coupled with a respective cap adapted for turning by hand.

2. The adjustable auxiliary rear-view mirror mounting structure of claim 1 wherein each of said connector has a slot intersecting the first through hole thereof and adapted for receiving the respective first nut; the first end of each of said outer arms has a slot intersection the screw hole thereof and adapted for receiving the respective second nut.

3. The adjustable auxiliary rear-view mirror mounting structure of claim 1 wherein the second end of each of said inner arms has a toothed recess adapted for receiving the cap of the respective first screw; each of said connectors has a toothed recess adapted for receiving the cap of the respective second screw; the cap of each of said first screw and said second screw has a toothed bottom wall adapted for meshing with the toothed recess of the corresponding first arm or the corresponding connector.

4. The adjustable auxiliary rear-view mirror mounting structure of claim 1 wherein said binding means comprises: a first binding device and a second binding device respectively fastened to the first ends of said inner arms, and a connecting device connected between said first binding device and said second binding device, said first binding device comprising a receptacle, said second binding device comprising a series of studs, said connecting device comprising a tie strap, a screw, a nut, and a cup, said tie strap having a longitudinal series of retaining holes longitudinally spaced from a tail end thereof and adapted for coupling to the series of studs of said second binding device, and a head at one end inserted into the receptacle of said first binding device and secured thereto by the screw, nut, and cup of said connecting device, the head of said tie strap having a longitudinal through hole for the passing of the screw of said connecting device, a transverse slot intersecting the longitudinal through hole thereof and adapted for receiving the nut of said connecting device, the screw of said connecting device is inserted through a through hole in the cup of said connecting device and the longitudinal through hole of the head of said tie strap and threaded into the nut of said connecting device.

5. The adjustable auxiliary rear-view minor mounting structure of claim 4 wherein said first binding device and said second binding device comprise a respective vacuum mount at an outer side adapted for securing to the rear-view mirror of the motor vehicle.

6. The adjustable auxiliary rear-view mirror mounting structure of claim 4 wherein the first end of one of said inner arms to which said second binding device is installed has a hole adapted for receiving the tail end of said tie strap.

7. The adjustable auxiliary rear-view mirror mounting structure of claim 1 wherein said binding means comprises a pair of first tie straps and a pair of second tie straps, each of said first tie straps having one end fastened to the first end of one of said inner arms and an opposite end terminating in a receptacle, each of said second tie straps having one end fastened to the first end of one of said inner arms and an opposite end terminating in a head inserted into the receptacle of one first tie strap and secured thereto by a screw and a nut, the head of each of said second tie strap having a longitudinal through hole adapted for the passing of the corresponding screw, and a transverse slot intersecting the respective longitudinal through hole and adapted for receiving the corresponding nut.

8. The adjustable auxiliary rear-view mirror mounting structure of claim 1 wherein said binding means comprises: a first binding device and a second binding device respectively fastened to the first ends of said inner arms, and a connecting device connected between said first binding device and said second binding device, said first binding device comprising two slotted retaining plates bilaterally disposed at one end and respectively connected to the first end of one of said inner arms by a first pair of binding straps, and a receptacle at an opposite end, said second binding device comprising two slotted retaining plates bilaterally disposed at one end and respectively connected to the first end of one of said inner arms by a second pair of binding straps, and a series of studs longitudinally disposed at an opposite end, said connecting device comprising a tie strap, a screw, a nut, and a cup, said tie strap having a longitudinal series of retaining holes longitudinally spaced from a tail end thereof and adapted for coupling to the series of studs of said second binding device, and a head at one end inserted into the receptacle of said first binding device and secured thereto by the screw, nut, and cup of said connecting device, the head of said tie strap having a longitudinal through hole for the passing of the screw of said connecting device, a transverse slot intersecting the longitudinal through hole thereof and adapted for receiving the nut of said connecting device, the screw of said connecting device is inserted through a through hole in the cup of said connecting device and the longitudinal through hole of the head of said tie strap and threaded into the nut of said connecting device.

9. The adjustable auxiliary rear-view mirror mounting structure of claim 8 wherein said second pair of binding straps are connected in parallel by a strap holder, said strap holder comprising two outer loops respectively mounted around said second pair of binding straps, and an intermediate loop adapted for receiving the tail end of said tie strap.

10. The adjustable auxiliary rear-view mirror mounting structure of claim 1 wherin said binding means comprises: a first binding device and a second binding device respectively fastened to the first ends of said inner arms, and a connecting device connected between said first binding device and said second binding device, said first binding device comprising two retaining holes bilaterally disposed at one end and respectively connected to the first end of one of said inner arms by a first pair of binding straps, and a receptacle at an opposite end, each binding strap of said first pair of binding straps having a front end fastened to the first end of one of said inner arms and a rear end terminating in a hooked portion adapted for hooking in one retaining hole of said first binding device, said second binding device comprising two retaining holes bilaterally disposed at one end and respectively connected to the first end of one of said inner arms by a second pair of binding straps, and a series of studs longitudinally disposed at an opposite end, each binding strap of said second pair of binding straps having a front end fastened to the first end of one of said inner arms and a rear end terminating in a hooked portion adapted for hooking in one retaining hole of said second binding device, said connecting device comprising a tie strap, a screw, a nut, and a cup, said tie strap having a longitudinal series of retaining holes longitudinally spaced from a tail end thereof and adapted for coupling to the series of studs of said second binding device, and a head at one end inserted into the receptacle of said first binding device and secured thereto by the screw, nut, and cup of said connecting device, the head of said tie strap having a longitudinal through hole for the passing of the screw of said connecting device, a transverse slot intersecting the longitudinal through hole thereof and adapted for receiving the nut of said connecting device, the screw of said connecting device is inserted through a through hole in the cup of said connecting device and the longitudinal through hole of the head of said tie strap and threaded into the nut of said connecting device.

11. The adjustable auxiliary rear-view mirror mounting structure of claim 1 wherein said lamp socket and mirror holder is connected between said outer arms to hold an auxiliary mirror, said auxiliary mirror being fastened to said lamp socket and mirror holder by a self-tapping screw, which is coupled with a cap for turning by hand.

12. The adjustable auxiliary rear-view mirror mounting structure of claim 1 further comprising a wrench adapted for turning said screws and said caps, said wrench compning a first head defining a crossed slot, a second head defining a Phillips slot, and a projecting tip raised from said second head.

* * * * *